May 2, 1967 S. O. SMITH 3,316,789
DROP LEAF DECK SAW
Filed Sept. 2, 1965 3 Sheets-Sheet 1
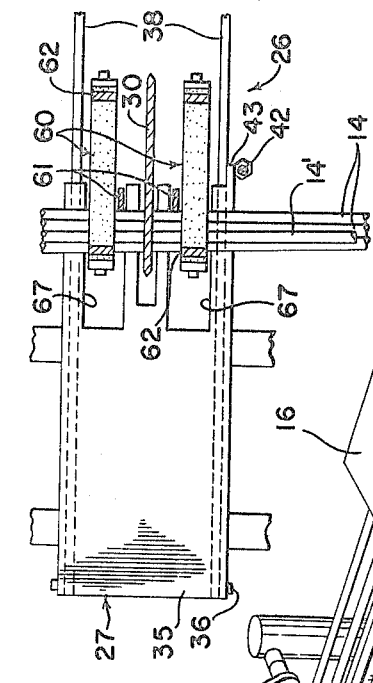
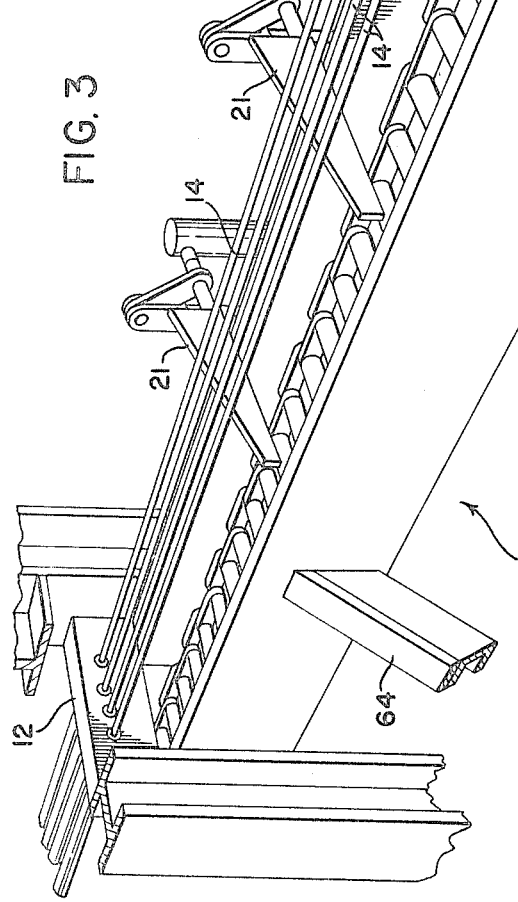
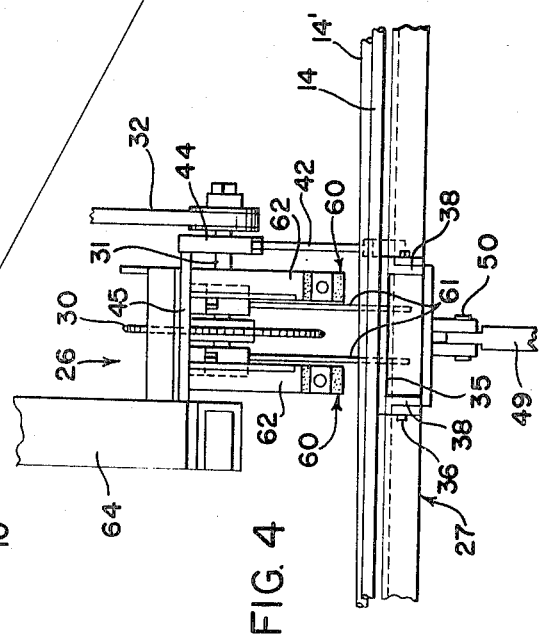
INVENTOR.
STUART O. SMITH
BY *Tilberry & Body*
ATTORNEYS

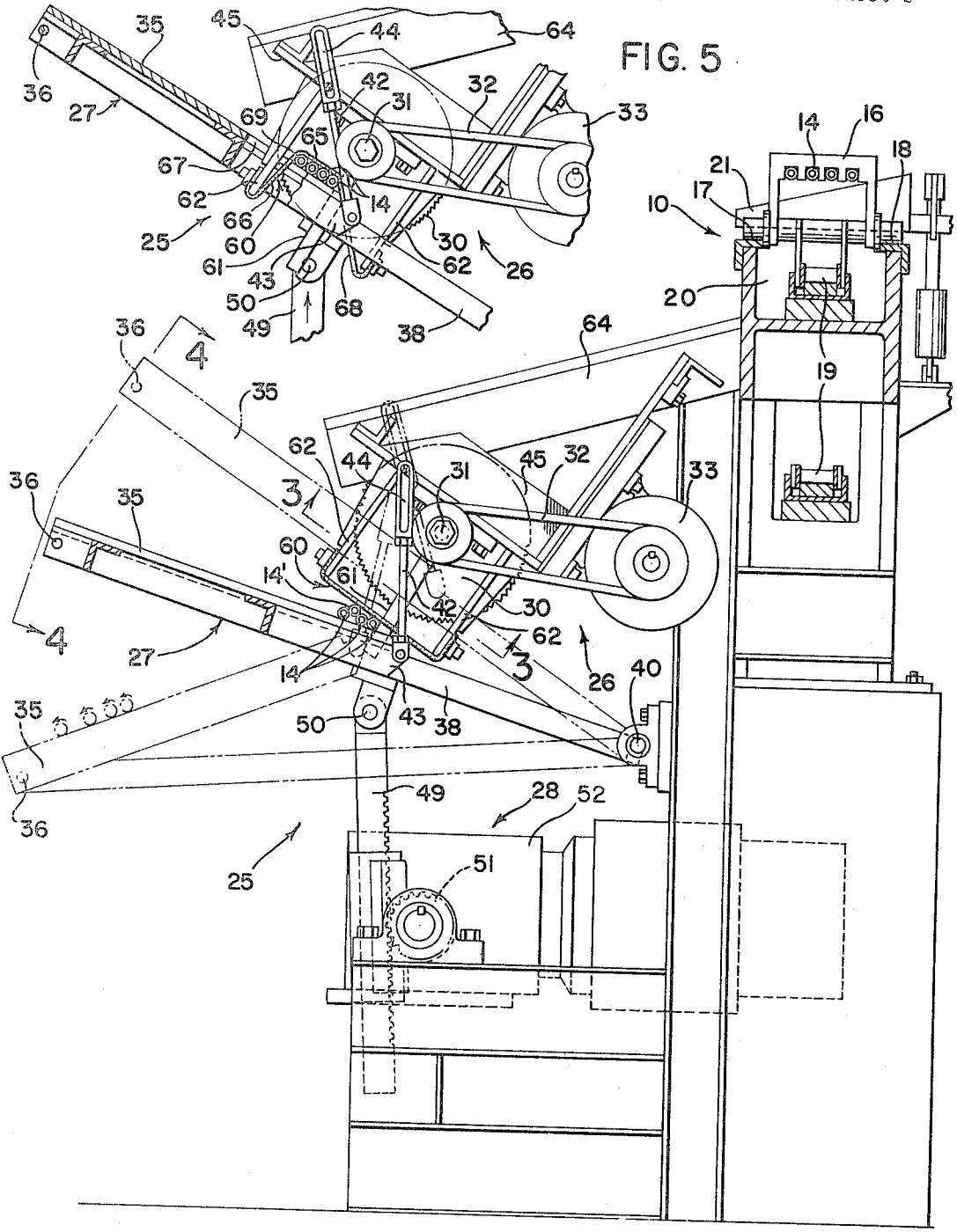

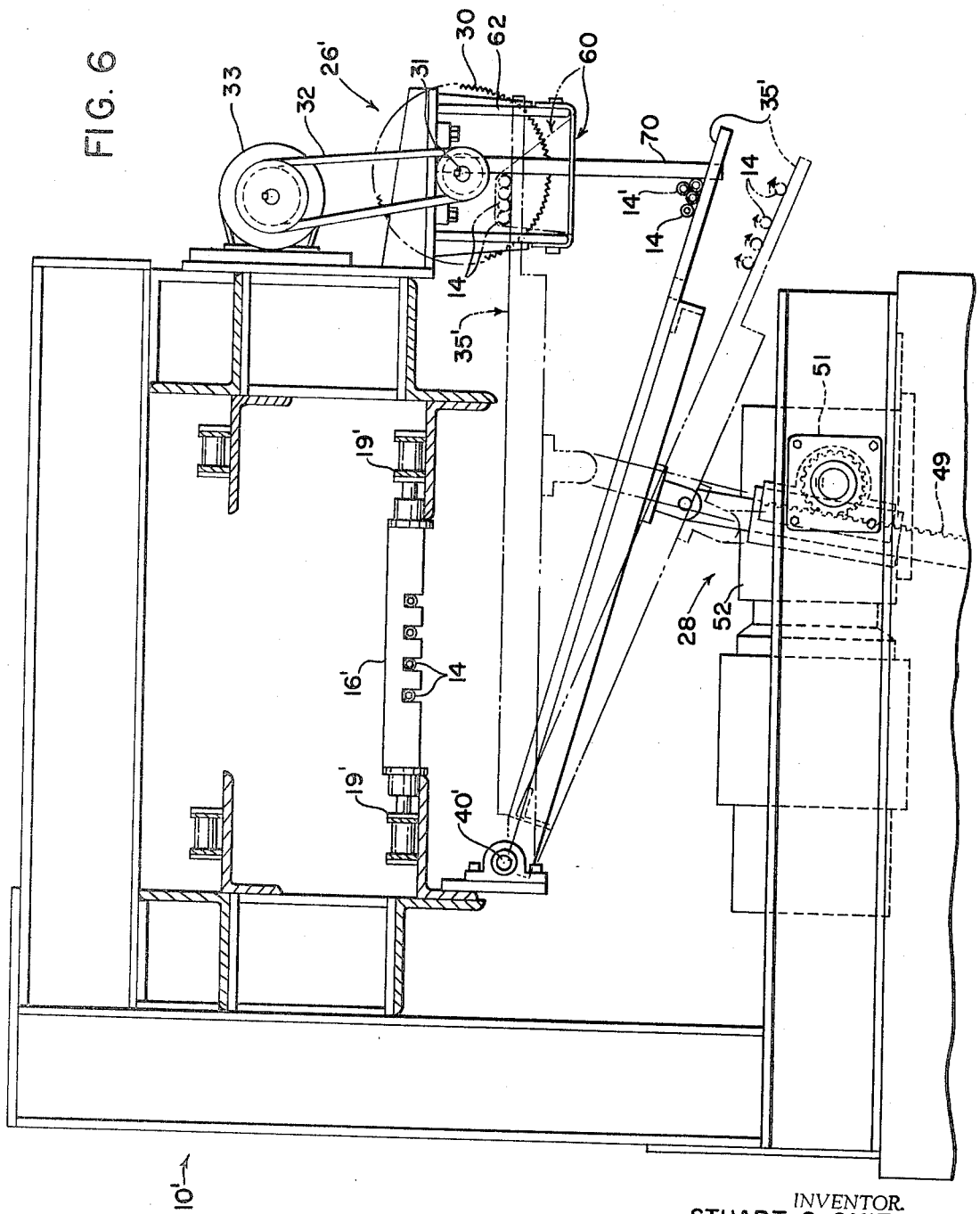

United States Patent Office 3,316,789
Patented May 2, 1967

3,316,789
DROP LEAF DECK SAW
Stuart O. Smith, Chagrin Falls, Ohio, assignor, by mesne assignments, to National Copper Development Co., Solon, Ohio, a corporation of Ohio
Filed Sept. 2, 1965, Ser. No. 484,593
6 Claims. (Cl. 83—453)

This invention pertains to the cutting art, and more particularly, to apparatus for cutting small sized, linear workpieces.

The invention concerns the cutting of tubing, wire, rod or the like which is long in proportion to its diameter and will be described in relation to a drawbench type of tube forming operation in which several tubular workpieces are drawn simultaneously through a diestand by means of a traveling carriage moving longitudinally relative to the diestand. Apparatus of this general type is disclosed in United States Patent 3,107,006, issued Oct. 15, 1963, and while the invention will be described with particular reference to the cutting of such drawn tubing, it will be appreciated that it has much broader applications and may be equally useful wherever long workpieces of small diameter are to be cut to prescribed lengths.

A conventional drawbench includes a diestand mounted at one end and a carriage which is adapted to run on tracks extending longitudinally toward the opposite end. The diestand includes a plurality of drawing dies arranged side by side with parallel axes. The leading end of each workpiece is gripped by the carriage and as it moves away from the diestand, it pulls each workpiece with it. When the carriage reaches the far end of the tracks, stock reduction is completed and the carriage gripping means is released at approximately the same time as the trailing ends of the workpieces pass through the diestand. The drawn tubing then free falls on a downwardly inclined table and rolls sideways into a storage rack.

In drawing ductile metals, such as copper, the initial tubular stock may be six or eight feet in length and have a three inch O.D., however, at the completion of the drawing operation, which may involve consecutive passes through smaller and smaller dies, the original stock will be elongated to perhaps a hundred feet in length and reduced considerably to an O.D. of perhaps less than half an inch. These small tubing sizes are extremely difficult to handle due to the excessive length in relation to the cross-sectional area and the separate tubes tend to entangle with each other in a bundle when released and rolled out of the drawbench.

One problem caused by entangling is the difficulty in cutting the tubing into the prescribed lengths with conventional circular power saws. It is not feasible to completely untangle the bundle and make each tube lie flat during cutting and if it is attempted to cut transversely through a bundle without first orienting the section in the plane of the sawblade so that each tube is directly supported, the cut produced is jagged and the unsupported, severed ends tend to fly around in an uncontrolled fashion.

This difficulty and other are overcome with the present invention which provides that each tube in the vicinity of the cutting plane is pressed flat against a work support and extends generally parallel to each other tube in the bundle.

In accordance with the invention, a cutting apparatus is provided comprising a saw, a work support movable toward and away from the saw, and a pair of elastic members each extending in a plane between the saw and work support on opposite sides of the cutting line such that as a bundle of tubing to be cut is moved toward the saw on the work support, a portion of each elastic member is flexed and taken along by the tubing in its movement toward the saw in a manner providing that each tube in the vicinity of the cutting line is resiliently pressed against the work support prior to engagement with the saw.

Also as provided in the invention, the saw includes a circular blade rotating on a horizontal axis and the work support is a rectangular deck pivoted on an axis parallel to the blade rotational axis.

Further in accordance with the invention, where the work support is a tiltable deck pivoted along one longitudinal edge, the tubing is collected at the opposite edge and a pair of transverse slots in such opposite edge register with the pair of elastic members when the deck is pivoted into a cutting position.

In another development of the invention, the tiltable deck is pivoted on a support arm which in turn is pivoted along a parallel axis, the arrangement being such that the deck is tilted upwardly for cutting on the support arm pivot axis and is tilted downwardly on its own axis for dumping the tube after cutting.

The principal object of the invention is to provide a solid supporting surface during a cross cutting operation for each of several workpieces having a diameter that is small in relation to their length tending to cause them to become entwined as a longitudinal bundle.

Another object is to provide an elastic holddown extending crosswise of the bundle on each side of the cutting plane in an arrangement providing that the elastic holddown is tensioned across the bundle prior to cutting causing each workpiece to lie flat in a parallel row.

Another object is to provide a tiltable support surface which may be inclined above or below a horizontal plane relative to a circular saw rotating on an axis parallel to the pivot axis of the support surface.

The features of the invention together with further objects and advantages thereof may best be understood by reference to the following description taken in conjunction with the accompanying drawings in which:

FIGURE 1 illustrates a drawbench of the type in which the invention is particularly intended for use showing tubing being drawn and which is to be subsequently cut;

FIGURE 2 is a sectional view showing the relative positions of the drawbench and inventive cutting apparatus with a longitudinally extending tubing bundle positioned thereon prior to the cutting operation;

FIGURE 3 is a view taken along line 3—3 of FIGURE 2 showing elastic holddown members;

FIGURE 4 is an end view taken along line 4—4 in FIGURE 2 of the holddown members;

FIGURE 5 is a partial view similar to FIGURE 2 showing the position of the cutting apparatus at the completion of the cutting operation; and FIGURE 6 is a sectional view similar to FIGURE 2 showing a modification of the invention.

Referring now to the drawings wherein the showings are for the purpose of illustrating a preferred embodiment of the invention only and not for the purpose of limiting same, FIGURE 1 is exemplary of a conventional drawbench 10 which includes a diestand 12 and a carriage 16. The drawbench 10 is arranged to handle the drawing of four tubular workpieces 14, however, any number which is feasible may be drawn by modifying the diestand 12 and carriage 16 in a known manner. The tubing 14 is pulled by means of the traveling carriage 16 which is arranged to grip the leading end of each tube 14 and roll on tracks 17, 18 extending longitudinally out from the diestand 12. A chain 19 traveling underneath in a channel 20 powers the carriage 16 back and forth on the tracks 17, 18.

It will be appreciated by those familiar with a drawbench operation that as the carriage 16 reaches the end of its traverse, the leading end of each tube 14 is simultaneously released by the carriage 16 approximately at the same time as the trailing end pass through the diestand 12, thus the tubing 14 free falls, striking the downwardly inclined arms 21 and rolls laterally off the drawbench 10.

Referring now to FIGURES 2–4, a cutting apparatus 25 is arranged alongside the drawbench 10 for severing the tubing 14 into prescribed lengths and includes a circular saw assembly 26, tiltable work support 27 and lift mechanism 28.

The saw assembly 26 comprises a circular blade 30 mounted on a horizontal arbor 31 driven by a belt 32 from a drive motor 33. A number of saw assemblies 26 may be longitudinally spaced beside the drawbench 10 at intervals depending on the number of sections of tubing 14 which is to be cut.

The tiltable work support 27 includes a drop leaf deck 35 extending the length of drawbench 10 pivotally mounted at 36 adjacent its outer edge to an arm 38 which, in turn, is pivotally mounted at 40 adjacent its inner end below the saw assembly 26. A link 42 connects the inner edge 43 of the deck 35 to a stationary L-shaped frame 45 by means of a sliding pin connection 44 permitting relative movement of the work support 27 with respect to the saw assembly 26 but limiting downward movement of the edge 43 of deck 35 in a manner described hereinafter.

The lift mechanism 28 includes a rack 49 pivotally connected at 50 to the arm 38 of the tiltable work support 27 and is operated for up and down movement by pinion 51 and reversible motor and gear box assembly 52 for tilting the support 27 between neutral, cutting, and dump position as illustrated in FIGURE 2.

In accordance with the invention, work holddowns 60 extend parallel to the saw blade 30 on opposite sides of the cutting plane as best seen in FIGURES 3 and 4. The holddowns 60 in the preferred embodiment of the invention are rubber bands each of which lie in a neutral position plane, which plane is below the cutting arc of saw blade 30 and above the drop leaf deck 35, the significance of which arrangement will be explained hereinafter. The opposite end of each holddown band 60 is secured to a bracket 62 having front and rear parallel arms spaced sufficiently far apart so as to slightly tension the bands 60 in the neutral position plane.

After the drawing operation, the tubing 14 rolls down a stationary inclined table 64 extending lengthwise of the drawbench 10 and then onto the deck 35 of the cutting mechanism 25. At this time the deck 35 is in the neutral or tube receiving position shown in solid lines in FIGURE 2 with the surface thereof inclined above a horizontal plane so that the tubing 14 collects adjacent the inner edge 43 against stops 61. Due to the fact that the tubing is long in relation to its size, there is a tendency for it to tangle in a bundle because of being rolled about which means that instead of each tube lying flat on the deck 35 in parallel array, the tubes will be entwined longitudinally so that some sections of tubing, such as 14', will not be directly supported on the deck 35. As mentioned before, this is not an acceptable cutting arrangement since the unsupported tube section 14' would tend to twist producing an irregular cut and the severed ends would tend to fly around upon being engaged by the whirling sawblade 30 unless firmly held down.

Before cutting the tubing, one end of the bundle is abutted against an adjustable stop (not shown) at the far end of the deck 35 which serves as a meosuring point for determining the prescribed length of cut. After the proper length has been determined the lift mechanism 28 is operated, swinging the arm 38 about the pivot point 40 thus raising the deck 35 and tubing 14 relative to the circular saw assembly 26 and holddown bands 60. The inner edge 43 of the deck 35 has parallel notches 67 cut therein and spaced so as to register with the bands 60 and stops 61 (FIGURE 3) and, in accordance with the invention, as the bands 60 are engaged by the tubing, they begin to stretch uniformly out of the neutral position plane. As the deck 35 continues to rise, the bands 60 on each side of the cutting plane will be progressively stretched so that any unsupported tube sections 14' between the bands 60 will be pressed firmly against the deck 35 whereby the bundle is rearranged in a single parallel row at least in the vicinity of the cut by the time it encounters the saw blade 30 and the severed ends 69 are resiliently maintained in that position until the completion of the cut is reached as shown in FIGURE 5. The elastic bands 60 are not necessarily tensioned in a uniform manner since the portion 67 in contact with the tubing will be restrained from elongating due to the rather high frictional engagement with the tubing and depending upon the geometry at engagement in the neutral position plane, the two legs 66, 68 extending downwardly from the portion 65 will not necessarily be stretched the same amount. As shown in FIGURE 5, the leg 66 will be stretched to a lesser extent than the leg 68, however the corresponding legs of each band 60 on each side of the cut will be stretched substantially uniformly. While the predominant force exerted by the elastic holddown bands 60 is downwardly, there is a slight lateral creep imparted to the tubing in the direction of the greatest elongation or in the preferred embodiment, toward leg 68 of the bands 60. This creeping has the tendency of rolling the tubing to aid in the separation and shifting of the entangled bundle. Of course this combined pressing and rolling action may not be sufficient to untangle the bundle from end to end, however it is effective to force a rearrangement in the vicinity of the saw.

As provided by the invention, therefore each tube between the bands 60 is pressed flat against the deck 35 prior to being cut and any sections 14' which are not properly supported will be reoriented before engaging the saw blades.

At the completion of the cut, the support arm 38 has been raised to the uppermost position (FIGURE 5). Thereafter the motor and drive 52 is reversed lowering the rack 49 and support arm 38 below the tube receiving position of the deck 35. In the process of raising and lowering the deck 35, the link 42 slides relative to the L-shaped bracket 45 due to the lost motion connection 44. When the deck 35 has returned to the neutral or tube receiving position, further downward movement of the support arm 38 will cause the deck 35 to pivot at 36 due to the connection of inner edge 43 with the link 42. By this action the deck 35 is inclined downwardly in a dumping position (lower dot-dash position in FIGURE 2). The tubing, now cut into the prescribed lengths, rolls off the deck 35 into a support rack (not shown) located alongside. This arrangement has the advantage, due to the double pivot action, of greatly reducing the vertical throw required by the rack 49 in order to complete one cycle. Where the vertical height beneath the saw assembly 26 is ample, permitting a longer rack to be used, a modification of the invention may be adopted as shown in FIGURE 6.

In FIGURE 6, like parts will be identified by like numerals and similar parts by like numerals except with the addition of a prime mark. The chief difference in the modification of FIGURE 6 is that the deck 35' has one pivot point 40' and is swung through the neutral, cutting and dump positions at its outer edge. In this arrangement the tubing drops directly onto the deck 35' and a rigid stop 70 prevents the tubing 14 from rolling off the edge of the deck 35' when in the neutral position (shown in full lines). After the tubes roll to the outer edge against the stop 70, the deck 35' is raised to the cutting position in substantially a horizontal plane. The action of elastic bands 60 is essentially the same as previously described with respect to the preferred embodiment. After cutting, the deck 35' is lowered below the neutral position so that the outer edge clears the stop 70 and the cut tubing 14 rolls off.

Having now described a preferred embodiment of the invention, it will be appreciated by those skilled in the art that certain further modifications may be made without departing from the invention as defined in the appended claims except insofar as limited by the prior art.

I claim:

1. A holddown device for workpieces long in proportion to their size tending to cause entangling in a longitudinal direction comprising
   a work support having a flat work surface upon which is supported a plurality of workpieces,
   tool means operable in a plane perpendicular to the longitudinal axes of said workpieces and said work support and tool means being movable toward and away from each other, and
   elastic means extending transversely of the workpieces and being engageable therewith in such a manner as to progressively stretch thereacross upon relative movement of said work support and tool means causing a local rearrangement of the workpieces into a flat, parallel row prior to performing work thereon.

2. Apparatus of the type described comprising
   a cutting means operable in a predetermined cutting plane,
   work support means upon which is supported workpieces to be cut, each characterized by a length considerably in excess of its diameter tending to cause entangling in a longitudinal direction perpendicular to the cutting plane, one of said means being movable toward and away from the other, and
   an elastic member extending transversely of the workpieces so that movement of said one means relative to the other engages a portion of the elastic member and workpieces so as to stretch the elastic member across and down each side of the workpieces whereby any workpiece not firmly supported is shifted to achieve such firm support prior to cutting.

3. Apparatus according to claim 2 wherein the cutting means is a circular saw mounted on a horizontal rotatable arbor and the work support means comprises
   a flat deck pivoted at one edge on an axis parallel to the rotational axis of the saw arbor so that the opposite edge is tiltable under the saw between planes inclined above and below a horizontal plane.

4. Apparatus according to claim 3 wherein the elastic member comprises a rubber band stretched on each side of the cutting plane so as to be under slight tension prior to engagement with the workpieces.

5. Apparatus according to claim 4 wherein said opposite edge of the deck has a pair of transverse slots therein spaced so as to register with said rubber bands and allow the deck to tilt above a neutral position plane of the rubber bands whereby a portion of each band is taken along with workpieces in moving into the saw.

6. Apparatus according to claim 2 wherein the cutting means is a circular saw mounted on an arbor rotatable along a horizontal axis, the work support means comprising
   a drop leaf deck pivoted along one longitudinal edge parallel to the saw axis and extending beneath said saw at the opposite edge,
   an arm to which the deck is pivoted at one end and which in turn is pivoted at the opposite end, and
   lost motion link means connected to the opposite edge of the deck so as to cause said opposite edge to tilt upwardly at a predetermined position during the downward movement of said deck.

References Cited by the Examiner
UNITED STATES PATENTS

| | | | |
|---|---|---|---|
| 1,424,472 | 8/1922 | Goldberg | 83—411 |
| 1,641,222 | 9/1927 | Foisy | 83—411 |
| 3,222,970 | 12/1965 | Hill | 83—157 |

ANDREW R. JUHASZ, *Primary Examiner.*